CIRCUIT-ARRANGEMENT COMPRISING MEANS FOR THE PERIODIC INTERRUPTION OF A CURRENT SUPPLIED TO AN INDUCTANCE COIL

Filed Nov. 26, 1952

INVENTOR
PETER JOHANNES HUBERTUS JANSSEN
BY Fred M Vogel
AGENT

United States Patent Office 2,805,384

Patented Sept. 3, 1957

2,805,384

CIRCUIT-ARRANGEMENT COMPRISING MEANS FOR THE PERIODIC INTERRUPTION OF A CURRENT SUPPLIED TO AN INDUCTANCE COIL

Peter Johannes Hubertus Janssen, Eindhoven, Netherlands, assignor, by mesne assignments, to North American Philips Company, Inc., New York, N. Y., a corporation of Delaware Application November 26, 1952, Serial No. 322,622

Claims priority, application Netherlands December 19, 1951

1 Claim. (Cl. 323—61)

This invention relates to circuit-arrangements for the periodic interruption of a current supplied to an inductance coil, wherein the voltage set up across the coil upon interruption of the current is supplied through a transformer to a load circuit.

Known circuit-arrangements of this type suffer from the disadvantage that disturbing oscillations occur after any interruption of said current. For example, these disturbances may be troublesome in television receiver circuits, where the load circuit is a rectifying circuit producing the high direct voltage required for supplying the cathode-ray tube of the receiver. If the deflection current for the deflection coils of the cathode-ray is also taken from said circuit-arrangement the disturbing oscillations referred to also appear in the deflection circuit and impair the reproduction of the television receiver. If the number of turns of the secondary winding of the transformer is increased to raise the supply direct voltage, the influence of the disturbing oscillations is found to increase accordingly. This is due to the increasing influence of the leakage inductance of the transformer with an increase in the number of turns of the secondary winding.

It has hitherto been sought to minimize said leakage inductance but this does not achieve the desired effect, i. e., suppression of the disturbing oscillations.

The circuit-arrangement according to the invention is based on the recognition that it is not necessary to minimize the leakage inductance, since, in contradistinction thereto, substantially no disturbing oscillations occur at a very particular value of the leakage inductance.

The circuit-arrangement according to the invention has the feature that the leakage inductance of the transformer is chosen such that both at the instant of interruption and at the instant of completion of the supply circuit the current through the leakage inductance and the derivative of said current are zero.

Figure 1:
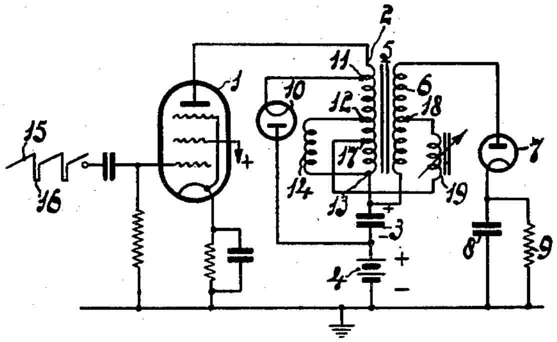
Figure 2:
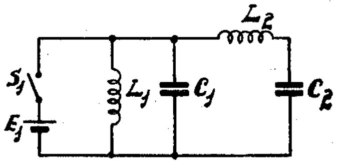

In order that the invention may be readily carried into effect, it will now be described in detail with reference to the accompanying drawing, wherein:

Fig. 1 illustrates schematically one embodiment of a circuit in accordance with the invention; and Fig. 2 is a circuit serving to assist in the explanation of the theory underlying the invention.

The circuit-arrangement shown in Fig. 1 comprises an electron discharge tube 1, the anode circuit of which comprises the series-connection of an inductance coil 2, a capacitor 3 and an anode supply 4.

The inductance coil 2 constitutes the primary of a transformer 5 having a secondary 6. This secondary 6 is at one end connected to the upper electrode of capacitor 3 and at the other end connected to the anode of a diode 7, the cathode of which is connected to ground by way of a filter capacitor 8. The load, for example, a cathode-ray tube, represented for convenience by a resistor 9, is connected in parallel with capacitor 8.

The positive terminal of battery 4 is further connected to the anode of a diode 10, the cathode of which is connected to a point 11 of winding 2. Connected between points 12 and 13 of winding 2 is a coil 14 which serves as a deflection coil for a cathode-ray tube.

The operation of the circuit-arrangement so far described, which serves to produce a saw tooth deflection current through coil 14 and, moreover, the high supply direct voltage for a cathode-ray tube, is generally known per se.

To the control grid circuit of tube 1 is applied a sawtooth voltage 15 exhibiting a negative voltage pulse 16 during the flyback.

During the up-stroke of the voltage 15, the winding 2 is traversed by a current increasing substantially linearly with the time. During at least part of the up-stroke the diode 10 is conductive with the result that the capacitor 3 is charged with the polarity indicated in Fig. 1, so that the voltage through the capacitor supports the action of battery 4 in the anode circuit of tube 1. The deflection coil 14 is traversed by a current increasing substantially linearly with the time. At the completion of the up-stroke the current supplied to coil 2 is cut off, because the negative pulse 16 at the control-grid of tube 1 interrupts the anode current of this tube. Consequently across coil 2 there is produced a high pulse voltage pulse, which induces a high voltage pulse in the secondary winding 6, the diode 7 then becoming conductive and a high direct voltage being produced across the parallel-connection of capacitor 8 and resistor 9.

Unless special precautions be taken it is found that after the flyback a disturbing oscillation appears in the transformer and the deflection coil 14 coupled thereto, said oscillation being occasioned by the leakage inductance of the transformer.

With reference to Fig. 2, which is an equivalent diagram of the part of the circuit-arrangement so far described and shown in Fig. 1, it will be explained how this disturbing oscillation can be reduced or suppressed.

In the diagram shown in Fig. 2 all vital elements of the circuit-arrangement are imagined to be transformed to the primary side of the transformer. $L_1$ represents the parallel-connection of the transformed self-inductance of deflection coil 14 and the self-inductance of the transformer. This self-inductance $L_1$ will hereinafter be referred to as the transformer inductance.

$C_1$ represents the sum of all capacities of the transformer windings, of coil 14, of diode 10 and of tube 1 and also of their wiring capacities. The capacity $C_1$ will hereinafter be referred to as the transformer capacity.

It will be evident that in the absence of coil 14, for example, the transformer inductance is made up only of the natural self-inductance $L_0$ of the transformer. $L_2$ represents the transformed leakage inductance of the transformer. $C_2$ represents the equivalent capacity of diode 7, the wiring capacity and the capacity of the smoothing capacitor 8, the latter capacity being practically not instrumental in this respect. Said capacity $C_2$ will hereinafter be referred to as the capacity of the load circuit.

The equivalent diagram further comprises a switch $S_1$ and a source of potential $E_1$.

At the instant $t=0$ corresponding to the beginning of the flyback of the current through coil 2, switch $S_1$ opens, i. e., that in the circuit-arrangement shown in Fig. 1, tube 1 is cut-off, the switch $S_1$ closing again at the instant $t=\tau$ corresponding to the completion of the flyback.

If the occurrence of oscillations in the series-connection of the leakage inductance $L_2$ and capacitor $C_2$ of the load circuit is to be avoided after the instant $t=\tau$ it is necessary, both before the instant $t=0$ and before the instant $t=\tau$, to satisfy the conditions that the voltage through capacitor $C_2$ corresponds to the voltage $E_1$, that the current $i_{L_2}$ through the leakage inductance $L_2$ is zero at said instants and that the derivative $$\frac{di_{L2}}{dt}$$

of said current is also zero. These conditions make it possible to establish the necessity of very definite values holding for the ratio of the two parallel resonance frequencies $\alpha$ and $\beta$ of the circuit comprising the three parallel circuits shown in Fig. 2.

The condition which is optimum for other reasons is given by the relation:

$$\frac{\beta}{\alpha}\approx 3\left(1-0.36\frac{z}{1-z}\right)$$

where $z$ represents the ratio between the time of interruption ($\tau$) and the duration of the period.

As stated above, there are still other values for $$\frac{\beta}{\alpha}$$

at which no or substantially no disturbing oscillations occur, for example, if:

$$\frac{\beta}{\alpha}\approx 5\left(1-0.39\frac{z}{1-z}\right)$$

If, for example, $z=0.15$ as is often the case in television, the optimum value is $$\frac{\beta}{\alpha}\approx 2.8$$

When further elaborating the last-mentioned condition for $$\frac{\beta}{\alpha}$$

it is found that if $$\frac{C_2}{C_1}=p \text{ and } \frac{L_2}{L_1}=q$$

the expression $10pq=(pq+p+1)^2$ must be satisfied.

Hence, if the value of the inductance of transformer $L_1$ is fixed and if this also holds for the capacity of transformer $C_1$ and the capacity of load circuit $C_2$, a correct choice of the value of leakage inductance $L_2$ permits the desired condition to be fulfilled.

At the given value $$\frac{\beta}{\alpha}=2.8$$

the maximum value:

$$iL,\frac{\alpha\beta}{\beta-\alpha}=1.55\alpha iL_2$$

where $i$ represents the current through the inductance $L_1$ at the instant $t=0$, is found for the voltage through capacitor $C_2$.

At the other possible values for $$\frac{\beta}{\alpha}$$

practically no disturbing oscillation occurs, it is true, but the maximum value of the voltage through capacitor $C_2$ is much smaller, so that the value 2.8 for $$\frac{\beta}{\alpha}$$

is optimum if the circuit-arrangement is used for generating high direct voltages.

If, in accordance with prior art arrangements, the leakage inductance could be made very low, i. e., approximately zero, the voltage through capacitor $C_2$ would maximally attain $\alpha iL_1$. Hence, the use of the circuit-arrangement according to the invention, as compared with the solution hitherto considered ideal, yields a high voltage which is more than a factor 1.5 higher.

With the circuit-arrangement shown in Fig. 1, the correct proportions are obtained by a judicious choice of the coupling factor of the transformer and the values of the self-inductance and capacity of the transformer and also of the capacity of the load circuit.

It will, however, often be preferred to make the coupling factor of the transformer variable in order that it may be adjusted to the correct value, for example, in the manufacture of television apparatus.

One embodiment of such a solution is shown in Fig. 1, in which an additional coupling circuit comprising an inductance coil having an adjustable inductance value is provided between the primary and the secondary of transformer 5. To this end a connector comprising the variable inductanct coil 19 is provided between point 17 of the primary 2 and point 18 of the secondary 6.

The correct coupling factor and consequently the correct value of the leakage inductance of the transformer are obtained by correct setting of the value of the inductance of coil 19.

It will be obvious that instead of using tappings on the transformer windings, the coupling circuit may be obtained by means of additional windings coupled to the primary and the secondary of the transformer respectively.

While I have thus described my invention with specific examples and embodiments thereof, other modifications will be readily apparent to those skilled in the art without departing from the spirit and the scope of the inventions as defined in the appended claim.

What I claim is:

A television circuit arrangement comprising a transformer having a primary coil and a secondary coil, a two-terminal source of operating voltage, a load circuit including a rectifier connected to said secondary coil, a capacitor connected between one end of said primary coil and one of said terminals, means connected to supply a periodically interrupted current flow in said primary coil, a rectifier connected between a point on said primary coil and said one terminal of the source of operating voltage, a deflection coil connected between two points on said primary coil, and an inductor connected between a point on said primary coil and a point on said secondary coil.

References Cited in the file of this patent

UNITED STATES PATENTS

| | | |
|---|---|---|
| 2,275,028 | Chittick et al. | Mar. 3, 1942 |
| 2,376,215 | Welch | May 15, 1945 |
| 2,503,745 | Kerkhof | Apr. 11, 1950 |
| 2,536,839 | Clark et al. | Jan. 2, 1951 |
| 2,568,471 | Torsch et al. | Sept. 18, 1951 |
| 2,579,542 | Bostick | Dec. 25, 1951 |
| 2,588,659 | Pond | Mar. 11, 1952 |
| 2,612,622 | Thalner | Sept. 30, 1952 |
| 2,615,138 | Grimm | Oct. 21, 1952 |